United States Patent [19]

Blankenship et al.

[11] 4,258,739

[45] Mar. 31, 1981

[54] HERMETICALLY SEALED HIGH PRESSURE GAS CONTAINER

[75] Inventors: John E. Blankenship, Fredericksburg; Roy W. Hoback, Dahlgren, both of Va.

[73] Assignee: The United States of America as represented by the Secretary of the Navy, Washington, D.C.

[21] Appl. No.: 954,020

[22] Filed: Oct. 23, 1978

[51] Int. Cl.[3] .............................................. F16K 13/04

[52] U.S. Cl. ........................................ 137/71; 137/74; 141/348; 220/266; 220/364

[58] Field of Search ........................ 137/68 R, 71, 797; 53/80; 141/348, 349, 350; 62/292, 299; 220/266, 364

[56] References Cited

U.S. PATENT DOCUMENTS

| | | | |
|---|---|---|---|
| 2,141,232 | 12/1938 | Wallace et al. | 137/71X |
| 2,702,993 | 3/1955 | Harris | 62/292 |
| 2,816,690 | 12/1957 | Lari | 141/2 X |
| 4,069,686 | 1/1978 | Hoelman | 141/349 X |

*Primary Examiner*—Harold W. Weakley

*Attorney, Agent, or Firm*—R. S. Sciascia; A. L. Branning

[57] ABSTRACT

A hermetically sealed high pressure gas container comprising a high strength chamber for confining the gas and a check valve fitted on and soldered to a boss formed integral with the chamber. The check valve serves as a temporary seal and permits the chamber to be charged with gas under atmospheric conditions. After charging, the inlet port of the check valve is soldered closed to provide a hermetic seal.

7 Claims, 1 Drawing Figure

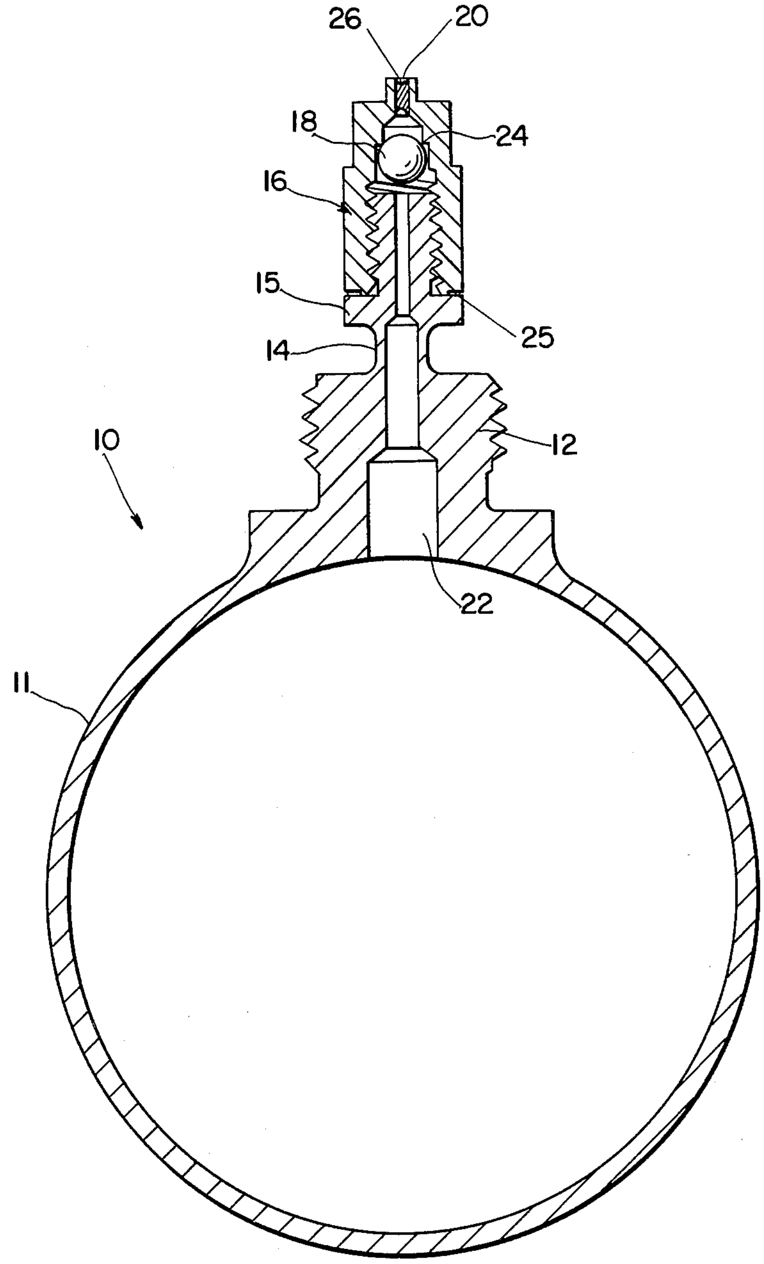
26
20
18
24
16
15
25
14
10
12
22
11

HERMETICALLY SEALED HIGH PRESSURE GAS CONTAINER

BACKGROUND OF THE INVENTION

This invention relates generally to high pressure gas containers and more particularly to hermetically sealed high pressure gas containers having extended shelf life and capable of being inexpensively constructed and charged.

High pressure gas containers find many uses in the guided projectile and guided missile arts as well as various other arts. The pressurized gas represents a compact source of energy which may be used to perform various functions, e.g., uncaging gyros, cooling detector elements of infrared seekers, deflecting control surfaces, etc. Prior art high pressure gas containers relied principally on metal to metal seals to confine the gas within the container. Some of these prior art devices depended upon a threaded union which necessitates an extremely good surface finish to obtain a seal. Other devices utilized a soft metal insert which was deformed during closure in an attempt to obtain an effective seal. In both types of devices, and particularly that using the threaded union, the machining of parts must be done to close tolerances. These metal to metal seals were frequently imperfect and it was found that the confined gas had slowly leaked out of the container which resulted in a short shelf life. Since guided projectiles and guided missiles are often stored for considerable periods of time prior to use, the potential short shelf life is disadvantageous.

Another disadvantage of the prior art designs was that the entire gas container had to be enclosed in a pressure vessel in order to be filled. The final sealing then had to be done remotely from outside the pressure vessel. This necessitated working through access glands and using special adapters to insure proper assembly and to obtain the precise torques required for correct assembly. When working with pressures on the order of 7000 psi, the friction inherent in the access glands made the obtaining of proper torques very difficult. The pressure chamber was necessary to keep the gas in the bottle since the prior art devices had no temporary means of sealing which would enable a hermetic seal to be made with the gas container in atmospheric conditions.

SUMMARY OF THE INVENTION

The present invention obviates the aforementioned difficulties by providing a high pressure gas container which may be charged with gas and hermetically sealed under atmospheric conditions. The invention comprises a gas chamber having a boss formed integral therewith. A check valve is threaded onto the boss and soldered in position to provide a hermetic seal between the check valve and boss. The chamber is then charged to the desired pressure with gas through the inlet port of the check valve. The fill line may be removed from the check valve inlet port since the check valve will provide a temporary seal for the gas chamber. The inlet port is then soldered closed to complete the hermetic seal. The boss is provided with a region of reduced cross-section so that a lateral blow applied to the check valve will fracture the boss at this point and allow the pressurized gas to flow out of the container.

STATEMENT OF THE OBJECTS OF THE INVENTION

It is a primary object of this invention to provide a hermetically sealed high pressure gas container having an extended shelf life.

It is another object of this invention to provide a high pressure gas container which may be charged and hermetically sealed under atmospheric conditions.

It is a further object of this invention to provide a high pressure gas container which may be manufactured without the need for close machining tolerances and yet be hermetically sealed to confine gas therein for extended periods.

It is yet another object of this invention to provide a method for charging and hermetically sealing high pressure gas containers under atmospheric conditions.

BRIEF DESCRIPTION OF THE DRAWING

Other objects, advantages and novel features of the present invention will become readily apparent upon consideration of the following detailed description when read in conjunction with the accompanying drawing wherein the single FIGURE of the drawing is a full section through the high pressure gas container of the present invention and illustrates the principal features thereof.

DESCRIPTION OF THE PREFERRED EMBODIMENT

Attention now is directed to the drawing wherein there is shown a hermetically sealed high pressure gas container designated generally by the reference numeral 10. The gas container 10 comprises a strong spherical chamber 11 having a boss 12 formed integral therewith. The boss 12 is provided with a region 14 of reduced cross section for a purpose which will be described later. The boss 12 is also provided with a mounting flange 15 against which a valve body 16 seats. The valve body 16 contains a ball 18 which cooperates with an internal shoulder 24 to define a check valve limiting gas flow through the valve body 16 to a single direction. The valve body is provided with an inlet port or gas passage 20 and the boss 12 is provided with a gas passage 22.

The gas container 10 is assembled and charged as follows. Prior to assembly the ball 18 is forced under pressure against the shoulder 24 to form a continuous valve seat surface on the shoulder. The chamber 11 and valve body 16 are then ultrasonically cleaned in Freon. The mounting flange 15 and the lower end of the valve body 16 are then tinned using a tin alloy solder and a Type 2 soldering flux. The ball 18 is then placed within the valve body 16 and the valve body threaded onto the boss 12 and into handtight engagement with the mounting flange 15. The assembly is then heated at 450° to 500° F. until the solder begins to flow and the valve body 16 further tightened to a predetermined torque while heating continues. The solder will flow and fill the space between the flange 15 and valve body 16 to form a hermetic seal 25 therebetween.

A charging line (not shown) from a source of high pressure, high purity argon gas is then coupled to the inlet port 20 of the valve body 16 to charge the chamber 11 with argon gas to the desired pressure. In one application for a guided projectile the pressure to which the chamber 11 is charged is approximately 7000 psi. The gas flows through the inlet port 20 around the ball 18 and through the gas passage 22 into the chamber 11. When the desired pressure has been reached, the charging line is removed from the inlet port 20 and the internal pressure immediately seats the ball 18 against the valve seat 24 to provide a temporary seal. Because of the temporary seal provided by the ball 18, there is no need for the container 10 to be enclosed in a pressure chamber. The entire charging operation can thus be conducted under atmospheric conditions. As soon as the filling of the chamber 11 has been completed, the gas container 10 is immersed in a water bath until the water level is at approximately 75% of the height of the valve body 16. The inlet port 20 is then soldered closed using a tin alloy solder and a Type 2 soldering flux to hermetically seal the gas container 10 with solder 26. The gas tight hermetic seals 25 and 26 insure an indefinite shelf life for the gas container 10.

The embodiment of the invention shown in the drawing is used in a guided projectile as follows. The container 10 is attached to a gas manifold (not shown) by means of the threads formed on the boss 12 adjacent the chamber 11 with the valve body projecting into the manifold. A cartridge device (not shown) is actuated by the projectile guidance system at the appropriate time to deliver a lateral blow to the valve body 16 causing the boss 12 to fracture in the region 14 and permit the gas confined in chamber 11 to flow through the gas passage 22 and into the manifold. The gas is then metered from the manifold to uncage the guidance gyros and to provide continuous cooling for the detector element of an infrared seeker forming part of the projectile guidance system.

From the foregoing it will be readily apparent that the present invention provides numerous advantages not found in prior art devices. For example, the container 10 may be charged under atmospheric conditions without the need for enclosure in a pressure vessel and the provision of means for remote manipulation of closure devices. Also, the temporary seal provided in the present invention prior to the hermetic sealing with solder means that the various parts of the container 10 need not be manufactured to highly restrictive tolerances. Further, the present invention reduces the number of parts needed and the amount of machining required to produce a gas container. Additionally, charging the bottle and releasing the gas is done simply, quickly and safely through only one port, giving a hermetically sealed long shelf life high pressure container.

Obviously many modifications and variations of the present invention are possible in the light of the above teachings and might readily occur to those skilled in the art. For example, although a ball check has been illustrated, a flat disk, tapered rod or other type of check valve could be used as well. Also, to release the gas a tip that could be sheared or a diaphram that could be ruptured could be provided rather than the reduced cross-section region on the container. Additionally, the hermetic seals between the valve body and boss and in the valve body inlet port could be made by various welding techniques or even by certain types of glue if the glue possesses the necessary creep strength. It is therefore to be understood that within the scope of the appended claims the invention may be practiced otherwise than as specifically described.

What is claimed is:

1. A hermetically sealed high pressure gas container having extended shelf life comprising:

a strong chamber for combining gas under high pressure having a boss integrally formed thereon, said boss having a gas passage therethrough;

a valve body secured to the end of said boss and having a gas passage therethrough;

valve means disposed within said valve body for permitting gas flow through said valve body into said gas chamber and for precluding gas flow from said gas chamber through said valve body;

first means for hermetically sealing said valve body to said boss;

second means for hermetically sealing the inlet end of the gas passage in said valve body; and a region of reduced cross-section formed in said boss between said gas chamber and said valve body whereby a lateral blow delivered to said valve body will fracture said boss and permit the gas confined in said chamber to escape.

2. A gas container as defined in claim 1 wherein means are provided on said boss for connecting said gas container into a manifold to facilitate controlled utilization of the escaping gas.

3. A gas container as defined in claim 1 wherein said valve means comprises a ball and a valve seat formed in the interior of said valve body to define a check valve.

4. A gas container as defined in claim 1 wherein said first and second hermetic sealing means comprise tin alloy solder.

5. A gas container as defined in claim 2 wherein said valve means comprises a ball and a valve seat formed in the interior of said valve body to define a check valve.

6. A gas container as defined in claim 2 wherein said first and second hermetic sealing means comprise tin alloy solder.

7. A gas container as defined in claim 5 wherein said first and second hermetic sealing means comprise tin alloy solder.

* * * * *